United States Patent
Rutledge et al.

[11] Patent Number: 5,945,979
[45] Date of Patent: Aug. 31, 1999

[54] COMBINED DIGITAL AND ANALOG CURSOR CONTROL

[75] Inventors: Joseph Dela Rutledge, Mahopac, N.Y.; Edwin Joseph Selker, Palo Alto, Calif.; John Daniel Upton, Georgetown, Tex.

[73] Assignee: International Business Machines Corporation, Armonk, N.Y.

[21] Appl. No.: 08/859,208

[22] Filed: May 20, 1997

Related U.S. Application Data

[63] Continuation of application No. 08/340,928, Nov. 17, 1994, abandoned.

[51] Int. Cl.[6] .................................................. G09G 5/00
[52] U.S. Cl. .................................... 345/161; 345/157
[58] Field of Search .............................. 345/160, 161, 345/163, 168, 157

[56] References Cited

U.S. PATENT DOCUMENTS

| | | | |
|---|---|---|---|
| 3,346,853 | 10/1967 | Koster et al. . | |
| 4,263,592 | 4/1981 | Takahashi et al. | 345/180 |
| 4,323,888 | 4/1982 | Cole | 340/365 |
| 4,493,992 | 1/1985 | Geller | 345/161 |
| 4,565,999 | 1/1986 | King et al. | 345/158 |
| 4,575,591 | 3/1986 | Lugaresi | 345/161 |
| 4,786,768 | 11/1988 | Langewis et al. | 345/161 |
| 4,839,634 | 6/1989 | More et al. | 345/173 |
| 4,935,728 | 6/1990 | Kley | 345/161 |
| 5,008,847 | 4/1991 | Lapeyre | 364/709.16 |
| 5,012,231 | 4/1991 | Felsenstein | 345/161 |
| 5,027,115 | 6/1991 | Sato et al. | 345/157 |
| 5,034,574 | 7/1991 | Martovitz | 345/161 |
| 5,063,376 | 11/1991 | Change | 345/163 |
| 5,541,622 | 7/1996 | Engle et al. | 345/161 |

FOREIGN PATENT DOCUMENTS

| | | | |
|---|---|---|---|
| 59-161725 | 9/1984 | Japan | 345/161 |
| 3263116 | 11/1991 | Japan . | |
| 9-204274 | 8/1997 | Japan . | |

OTHER PUBLICATIONS

"Speed Keyboard For Data Processor" IBM Technical Disclosure Bulletin, vol. 23. No. 2, pp. 838–839, Jul. 1980.

*Primary Examiner*—Amare Mengistu
*Attorney, Agent, or Firm*—Whitham, Curtis & Whitham; Stephan C. Kaufman

[57] ABSTRACT

A cursor control apparatus allows switching between at least two modes of cursor position control operation; one of which provides emulation of cursor control keys with a graphic input device. The emulation of cursor keys provides control of cursor location in a digital mode in which the cursor is rendered only at locations corresponding to character areas, fields or cells as opposed to an analog mode in which the cursor may be positioned at higher resolution, either by providing multiple increment inputs to a cursor position controller or by direct application of signals to cursor key inputs of a processor. Enhancements of the digital mode of operation including cursor movement speed control are also provided.

28 Claims, 1 Drawing Sheet

COMBINED DIGITAL AND ANALOG CURSOR CONTROL

RELATED APPLICATIONS

This application is a continuation of U.S. patent application Ser. No. 08/340,928, filed Nov. 17, 1994, now abandoned.

BACKGROUND OF THE INVENTION

1. Field of the Invention

The present invention generally relates to cursor controls, especially for displays associated with data processing devices, and, more particularly, to control of mode of operation of a cursor corresponding to either a graphic input device or cursor control keys which may be emulated by the graphic input device.

2. Description of the Prior Art

In the field of computers and data processors, it has long been recognized that the capability of a user to receive and assimilate information in order to interact easily with the computer is of major importance in the usefulness of the computer in many applications. The utility of increased "computing power" to execute programs at ever increasing speeds diminishes in all but a relatively few highly complex programs which require only slight interactivity with a user when the user cannot readily perceive, understand and react to the results. Therefore, the interest in and dedication of a significant fraction of available computing power to the user interface has become a widely accepted practice for both hardware and software design in the data processing field.

Input of control signals and data through the medium of a graphic display requires the use of a device by which a location on the display may be specified and a separate mechanism for selection. In the past, this has been accomplished with various devices which have become well-known and which are in widespread use, such as the mouse, light-pen, trackball (essentially an inverted mouse which does not need to be moved across a surface), gimballed and isometric joysticks and many special purpose arrangements such as adaptations to accommodate various physical disabilities of the user. These types of devices will hereinafter be referred to collectively as graphic input devices.

For specifying location of a cursor on a display, the widespread use of data processing devices for word processors has led to the development of a mode of cursor movement in which the cursor, often referred to as a text cursor, can only assume one of a plurality of positions where a character can be rendered (hereinafter referred to as character areas or locations) which are arranged in a matrix covering a predetermined area of the display. Character areas are necessarily much larger than the potential positional resolution of the processor and display since plural pixels are necessary to render a character. That is, the cursor may be only located at positions where an alphanumeric character can be rendered (e.g. a 9 by 14 pixel sized area), whereas the processor, graphic input device and display can generally support a resolution to the location of a single pixel.

In such applications, cursor position was generally controlled through the use of so-called cursor keys (which may have a repeating function after a fixed time, known as a type-a-matic function). Such keys has been generally included on the keyboards of personal computers for display control for many years. Other devices, such as the mouse, were generally "add-on devices". Further, until recent years the complexity of graphics processing was extremely expensive in terms of processor time and graphics processing was generally limited and not customarily manipulable by a user on an interactive basis.

However, more recently, graphics capabilities of data processing and display hardware have increased to meet an increased demand for high quality displays for presentation of information which is more readily assimilated by an operator than alphanumeric text. Accordingly, initial collection of graphical input data is more often done on a pixel level resolution and the resolution decreased, if deemed desirable for word processing applications and the like, by the application itself. Such a reduction in resolution (referred to hereinafter as a "digital mode" as distinct from pixel level resolution, hereinafter referred to as an "analog mode" since the quantization of movement is not generally evident to an operator), however, hides positional information from the user and reduces visual feedback. For example, the user does not have information as to the proximity of the specified location to the character space boundary and slight positional motion during actuation, for example, of a mouse button for selection of a location may cause a boundary to be crossed and erroneous selection to occur. For this reason, most graphical input devices which are capable of operation at high resolution are not considered well-suited to word or text processing applications.

As alluded to above, it is largely a historical accident that graphic input devices are used in such text processing applications. Since the availability of a graphical input device is generally marketed as an "add-on" device for personal computers, word processing and other text-based applications generally utilize such devices, if at all, by having a text cursor controlled by cursor keys associated with the text processing function of the application and with a separate graphic cursor image provided for the graphic input device but limiting the positional resolution at which the graphic cursor image can be displayed to that of the text cursor. Then, by selection of position at the location of the graphic cursor, the text cursor can be relocated to coincide therewith, whereupon, the graphics cursor is usually hidden. Even with hiding of the graphic cursor when not in active use, such a mode of operation is less than fully convenient and leads to erroneous operation since small vibrations and inadvertent movement can cause the graphics cursor to reappear, possibly confusing the user between the identities of the two cursors.

Additionally, it should be understood that cursor control keys are binary devices; being either actuated or not. On the contrary, most graphical input devices generally measure some parameter of control and have the capability of responding to the magnitude of the measured quantity with a differentiated response (e.g. cursor movement speed). For example, it is common to provide non-linear response rate of a mouse or joystick such that more extreme motion produces more or less than a proportionate response in position. That is, more rapid mouse movement can be sensed to control greater increments of positional motion on the display than would otherwise be produced by the displacement of the mouse if displacement occurred at a lower rate. Accordingly, analog mode cursor manipulation is very convenient for long, rapid cursor movement even though some increased likelihood of error may exist in specification of the final position (e.g. due to proximity to a character area boundary) and the additional inconvenience of a separate manipulation to then move the text cursor to the position of the graphic cursor.

Similarly, in either gimballed or isometric joysticks, it is common to provide for a dead zone around the center or neutral position and to increase cursor movement speed with pressure applied to the joystick or displacement distance from the neutral position. U.S. Pat. No. 5,012,231 to Felsenstein is exemplary of this latter type of arrangement and is hereby fully incorporated by reference. In contrast, cursor keys generally provide for movement to a contiguous character area location at each keystroke and repeated cursor movement at a constant speed after holding a cursor key for a predetermined duration. Except for other motions such as movement to the bottom or top of a screen, page or document or to the right or left end of a line, no other cursor movement enhancements are available due to the binary nature of the cursor keys. Therefore, even though cursor keys provide for precise, unambiguous movement among contiguous small numbers of character spaces or to particular document locations, graphic input devices generally provide for increased facility and speed of use which are not provided by cursor keys even though some inconveniences are presented in the provision of separate cursors, possibly operating in distinct modes.

Moreover, the recent trend toward miniaturization of data processing devices coupled with the fact that keyboards cannot be reduced in size beyond certain dimensions related to human physiology without compromising ease and convenience of use has created an incentive to reduce the number of keys made available on portable data processing devices. For example, it is common to use multiple shift keys (e.g. CNTL, ALT and function (FN or FCN)) for certain function and cursor control keys to multiply the functions of some of the keys on the keyboard so that other keys can be eliminated. Nevertheless, cursor control keys continue to be provided on many of even the smallest portable computers even though the function provided thereby is not optimal for user convenience and speed of use. Further, as indicated above, there are instances in which cursor key control is desirable since the limitation of cursor resolution by an application may result in ambiguous or erroneous response.

SUMMARY OF THE INVENTION

It is therefore an object of the present invention to provide an alternative graphic input arrangement for cursor control which will provide different, selectable modes of operation, alternatively yielding the advantages of both digital mode and analog mode cursor movement.

It is another object of the invention to provide a mode of operation for a graphical input device such as a mouse or joystick which selectively emulates operation of cursor control keys and allowing a graphic input device to be substituted therefor without loss of functionality or user convenience.

It is a further object of the invention to provide an arrangement for extending the functionality of either cursor control keys or a graphic input device by providing one or more additional operational modes beyond a default mode for each which emulate at least some desirable operational modes of other types of graphical input devices including cursor control keys.

It is yet another object of the invention to provide cursor control in selectable modes using a single input arrangement and a single displayed cursor image.

In order to accomplish these and other objects of the invention, a data processing system including means for producing a cursor image on a display is provided, including an arrangement for controlling an operational mode of controlling said cursor in response to manipulation of a graphic input device, and an arrangement for providing incremental cursor motion over a distance corresponding to a plurality of pixels in response to actuation of the graphic input device by an amount exceeding a threshold amount in one of at least two operational modes.

In accordance with another aspect of the invention, a cursor controller is provided including a graphic input device, an arrangement for storing coordinates of a current cursor location, a first signal processing path for incrementing or decrementing the cursor coordinates by a first amount in response to actuation of the graphic input device, a second signal processing path for incrementing or decrementing cursor coordinates by a second amount in response to actuation of the graphic input device, and an arrangement for controlling operation of the first second signal processing paths in a mutually exclusive manner.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
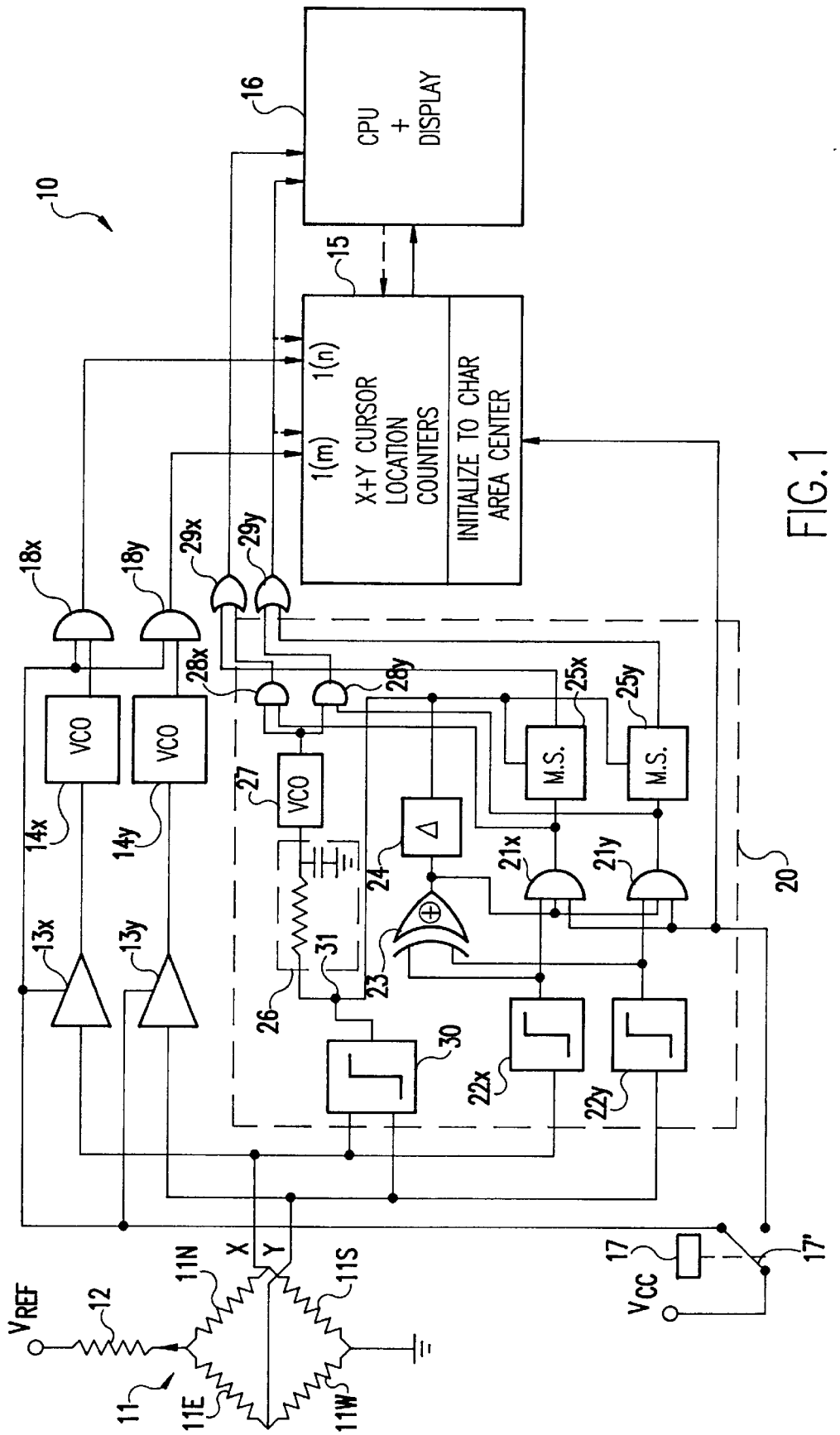
FIG. 1 is a schematic diagram of the functional elements of a preferred exemplary embodiment of the invention.

Referring now to the drawings, and more particularly to FIG. 1, there is shown, in highly schematic form, an exemplary organization 10 of elements in accordance with the invention. It is to be understood that this illustration is intended to enhance the clarity of explanation of the invention by presenting exemplary familiar functional elements in an arrangement which supports the novel operation of the present invention. It will, of course, be recognized by those skilled in the art and in view of the present disclosure, that the same functions could be obtained in many ways, including alternative logic circuits or software or hardware (e.g. in ROM) programming of a general purpose computer or data processor, especially including portable personal computers with which the invention is primarily intended to be used.

For example and in the interest of completeness of the present disclosure, it has been found preferable to provide for amplification and analog to digital conversion of the output of the graphich input device and to apply a variable and/or non-linear transfer function for conversion of graphic input device output voltage to a digital numeric value (as described in U.S. patent application Ser. No. 07/917,091, now issued as U.S. Pat. No. 5,764,219, by Rutledge and Selker, filed Nov. 29, 1990, and entitled "Controller for Improved Computer Pointing Device" (Attorney's Docket No. Y09-90-157P) which is hereby incorporated by reference in its entirety, for further processing by the each of the circuits providing respectively providing the analog and digital operational modes. Such a transfer function provides for an upper limit to cursor movement speed, compensates somewhat for irregularities of force or motion applied to the graphic input device and simulates some functions of various thresholding circuits, as discussed below, with "plateaus" in the transfer function. However, such details and adaptations to enhance ease of utilization of the invention by an operator based on empirical observations is not of the essence of the present invention.

A graphic input device 11 may be of any type and is not critical to the practice of the invention. However, it is contemplated that the preferred embodiment is implemented with an isometric joystick including four strain gauges, as is disclosed in U.S. patent application Ser. No. 08/340,935, now issued as U.S. Pat. No. 5,696,535 (Attorney's docket No. Y09-94-138) by J. D. Rutledge et al. and entitled Graphics Display Pointer with Integrated Selection which is assigned to the assignee of the present invention and hereby fully incorporated by reference herein. It is to be noted that the present invention is fully compatible with the structure and methodology disclosed therein and will most advantageously provide the novel functions described below in conjunction with that apparatus and the functions developed thereby. However, the additional structures disclosed in the incorporated applications are omitted here in the interest of clarity.

The four strain gauges 11E, 11W, 11N and 11S are preferably arranged in a bridge-like network, as shown foas shown forming a pair of voltage dividers, for best sensitivity since the change in resistance of each strain gauge due to force applied to the isometric joystick is very small. Resistor 12 allows sensing of common mode (e.g. Z-axis) variation in forces applied to the isometric joystick as explained in detail in the above incorporated U. S. Patent application. The bridge-like network thus outputs two additional voltages corresponding to force applied to the isometric joystick in each of two orthogonal directions, X and Y.

These voltages are then preferably amplified (e.g. about 500 times) at amplifiers 13$x$ and 13$y$ and the amplified outputs used to drive voltage controlled oscillators 14$x$ and 14$y$ to output a train of pulses having a frequency generally proportional to the amount of force applied to the isometric joystick. (Of course, as alluded to above, analog-to-digital conversion could be performed on the outputs of amplifiers 13$x$, 13$y$ and digitallly controller frequency generators or synthsizers used in place of voltage controlled oscillators.) Amplifiers 13$x$, 13$y$ preferably are arranged to function as difference amplifiers for comparing an input voltage to a reference voltage and to provide a further polarity signal (not shown) based on whether the input is above or below a reference value to allow incrementing or decrementing of counters 15 which serve to store current cursor location, as is well-understood in the art. These pulses may then be counted at cursor location counter 15 to increment or decrement a cursor location address at which the cursor is to be rendered on display 16 under control of the CPU.

The above arrangement is a basic description of a system for operation and manipulation of a graphics cursor in an analog mode which is, itself, well-understood in the art. An application (e.g. a word processor) running on the CPU could function to truncate or otherwise modify the address so that the graphics cursor could only be rendered in regard to a single character area or step increment, as is also common in the art, as discussed above. Nevertheless, a graphics cursor can be manipulated by a graphic input device of any type in such an environment with substantial freedom and will exhibit variation in speed of cursor movement even if restricted to character areas. Thus the cursor display, as rendered, may appear to move incrementally while the actual cursor location is maintained in accordance with an analog mode of operation, often causing position to change during selection. Therefore, as is also well-recognized, final positioning of the cursor at high accuracy is not easily performed with a graphic input device and may be disrupted by unintended motion of the graphic input device during selection operations. Cursor keys were therefore commonly used prior to the present invention for fine positioning of the cursor in accordance with steps, character locations, cells, fields and the like as may be defined and implemented by the application.

In accordance with the invention, cursor keys may be emulated for fine positioning with the same isometric joystick 11 used for graphic cursor control in the following manner. It should be noted that when cursor keys are emulated, dedicated cursor keys themselves become redundant and may be eliminated with substantial space savings in, for example, portable or so-called notebook computers.

As described above, cursor keys are binary devices and generally require that the cursor be operated in a digital mode (although the step may be variable and not limited to character areas in some applications, such as fields in database applications, steps in some simple graphics applications, cells in spreadsheet applications and the like). The outputs of the cursor keys are thus generally input directly to the CPU (rather than a cursor controller corresponding to the graphic input device) which responds to such inputs in the manner established by applications currently running thereon. The different signal paths used for graphic input devices and cursor control keys thus complicates emulation of cursor keys with a graphic input device and the provision of switchable cursor operational modes, as achieved by the present invention.

In accordance with the invention, to switch between the analog mode, described above, and a digital mode of operation, it is considered preferable to use a key already provided on a keyboard or other basic input device for the CPU. SHIFT, CNTL and ALT keys are preferred since the use of such keys can be considered to be highly intuitive to most users as well as not directly causing input to the CPU but, rather, providing an output only when used in conjunction with other keys. If available, the function (e.g. FN or FCN) key can alternatively be used and is highly suitable for the same reasons. However, it is to be understood that other arrangements such as a separate key, a button or capacitive touch sensors (e.g. to switch modes when only one side of a joystick is touched but the joystick is not gripped) on the graphic input device or a particular manipulation (e.g. negative Z-axis force on an isometric joystick) can also be used.

In a default or unactuated mode of key or switch 17, an enabling or gating voltage is preferably applied to amplifiers 13$x$ and 13$y$ and also to inputs of AND gates 18$x$ and 18$y$ to enable the outputs of the voltage controlled oscillators to be passed to the units inputs of the cursor location counters 15. This arrangement also allows interruption of these inputs when switch 17 is actuated. A pull-down resistor (not shown) may be used to provide a low logic level input to gates 18$x$, 18$y$ when Vcc is not applied thereto.

When switch 17 is actuated, the gating voltage to amplifiers 13$x$, 13$y$ and gates 18$x$, 18$y$ is interrupted and a similar gating voltage (e.g. Vcc) is applied to the digital cursor mode controller 20, indicated by a dashed line in FIG. 1. In a manner similar to the action of gates 18$x$, 18$y$, this voltage is provided to enable transmission of digital X and Y signals from the graphical input device 11 to cursor location counters 15 in a manner similar to but mutually exclusive of that described above.

The analog outputs of the graphic input device 11 are preferably transformed to digital logic levels by thresholding at 22$x$ and 22$y$ which may be embodied, for example, by positive feedback amplifiers using a non-linear circuit (e.g. diodes) in the positive feedback path. (As above, circuitry to determine the direction of control, such as duplication of the circuit elements 21, 22 and 23, illustrated, with the additional elements 22 adapted for negative thresholding, is well-understood in the art and is omitted from FIG. 1 in the interest of clarity.)

Thus, small amounts of force or motion applied to the graphic input device will not cause a change of logic level output of threshold circuits 22x, 22y but larger amounts of force or motion, exceeding a threshold will cause a change in the logic level of the outputs of either or both of the threshold circuits. The effect of this threshold processing of the output of graphic input device 11 is to provide a null response around the center location and thus to more closely emulate the digital action of keys such as cursor control keys.

It may be considered preferable in some implementations of the invention to provide for only four conditions (up, down, left and right) to be recognized and, in such a case, exclusive-OR gate 23 is provided to supply an additional enabling signal to AND gates 21x, 21y. If, on the other hand, diagonal motion is to be provided in the digital cursor operation mode, gate 23 may be an OR gate or omitted altogether. Other gating arrangements may also be provided to suppress or otherwise check for ambiguous signal states which may occur (e.g. simultaneous up and down signals due to noise). However, in order to provide for rerepeated cursor motion upon the occurrence of continued actuation in the manner of the type-a-matic function described above for cursor keys, it is preferred to provide some form of detection of the existence of some control signal at the outputs of threshold circuits 22x, 22y such as is performed by gate 23 in whatever form of logic circuit it may be provided.

As is evident from FIG. 1, when enabled in response to actuation of switch 17, and any further signal detection logic 23, if provided, the digital signal outputs of the threshold circuits 22x, 22y are provided to monostable circuits 25x, 25y which provide a single pulse output for each logic signal transition (e.g. rising) which indicates a newly detected actuation of the graphic input device. Preferably, however, monostable circuits 25x, 25y are also arranged to provide a train of pulses when enabled by a further signal in a manner well-understood in the art, preferably provided by delay circuit 24 in order to provide repeated cursor motion upon continued actuation for a predetermined period in the manner of a type-a-matic function described above.

It should also be noted that the respective outputs of monostable circuits 25x and 25y are provided to the CPU as cursor key input signals rather than the cursor location counter. These inputs will then be interpreted by the CPU under control of whatever application may be running in order to provide an unambiguous positioning of the Gursor in a digital operational mode.

Alternatively, as illustrated by dashed arrows in FIG. 1, the outputs of the monostable circuits 25x, 25y may be provided to m and n inputs of the cursor location counters 15 to cause the counters to be incremented by m pixel locations and n pixel locations respectively, corresponding to the dimensions of a character area in pixels. In this case, m and n are established (e.g. as fixed or dynamically variable increments) under control of the application.

As a perfecting feature of the invention if this latter alternative is implemented, it is also considered desirable to provide the mode switching signal from mode switching key 17 to cursor location counters 15 to initially adjust the least significant bits of the cursor location address to the center of the character area or other digital mode cursor location (e.g. cell or field) in which the cursor is currently located when the cursor mode is switched. Thereafter, incrementing and decrementing the counters 15 by a plurality of pixel locations corresponding to the dimensions of a character area in pixels assures that the address of the cursor location moves only from the center of one character area to the center of an adjacent character area. This refinement of the invention minimizes the likelihood of positional error occurring during selection or other operation even if the cursor operation mode is returned to analog mode prior to such selection or other operation since the distance of the cursor location address from the boundary of a character area is thus maximized. Of course, if the outputs of monostable circuits 25x, 25y are provided directly to the CPU as cursor key inputs and are interpreted in accordance with a running application, the stabilization of positioning in accordance with digital mode of operation will be similarly achieved.

In operation, the apparatus described thus far provides normal cursor control with a graphic input device such as an isometric joystick, preferably in a default mode. When a switch or other control arrangement is actuated to switch cursor operational mode, the graphic input device can be operated to provide digital cursor control and emulate the operation of cursor control keys such as by tapping an isometric joystick in the desired direction of cursor motion. Continuous pressure on the joystick (or movement of the graphic input device) will produce repeated incremental movement of the cursor on display 16.

Thus it is seen that the function of cursor control keys is fully emulated, including the pseudo-continuous motion of the type-a-matic function discussed above. The analog mode may be immediately resumed, preferably initialized to the center pixel location in a character space to minimize operational errors as the cursor operational mode is switched, by release of key 17. It should be appreciated that either the digital mode or the analog mode may be provided as the default mode when key 17 is unactuated. Similarly, a toggle key which causes effective alternation of position of switch 17' could be provided to avoid the need to hold key 17 in an actuated position when the apparatus is operated in other than the default mode.

As a further perfecting feature of the invention and to provide increased similarity of operating features in each of the analog and digital modes of cursor control operation, it is considered desirable to provide for variation of cursor speed movement while in the digital mode. In the past, this function has not been available through the use of keys and would have been counter-intuitive and awkward to use. However, when cursor keys are emulated by a graphic input device, particularly a joystick, it is quite intuitive to provide for an increase of cursor movement speed in response to any of several parameters of joystick motion.

For example, in a preferred arrangement of this perfecting feature of the invention, the output of delay 24 is preferably provided to a further time delay such as a preferred resistor-capacitor (RC) circuit 26. Thus, once the repeating mode of incremental cursor movement is entered, the voltage at the output of RC circuit 26 will slowly increase. This voltage is then provided as an input to a further voltage controlled oscillator (VCO) 27 which will provide additional motion increment pulses at a rate which increases with time. These pulses can be combined with the outputs of monostable circuits 25x, 25y with OR gates 29x, 29y or otherwise supplied to the CPU or cursor location counters 15 in an additive or alternative fashion. As shown in the circuit illustrated, it is considered possibly undesirable to have different rates of motion in the X and Y directions and, therefore, only a single VCO 27 is shown and the X and Y direction pulses are separately provided to OR gates 29x and 29y by ANDing with the outputs of gates 21x and 21y, respectively at AND gates 28x and 28y. Alternatively, independent VCO's 27 for each of the coordinate directions of cursor motion could be used to provide differential (e.g. oblique diagonal) cursor motion.

As an alternative, for provision of a variable cursor motion speed, a further thresholding device 30 could be provided so that pressure on a joystick (preferably in excess of the pressure required for detection at threshold circuits 22x, 22y) can also provide an input to RC circuit 26, either as alternative or supplement to input from delay 24, as schematically depicted at node 31 or the signals from threshold circuit 30 and delay 24 could be logically combined (such as substituting an AND gate at node 31) so that increase of speed would occur only after a delay and conditional upon increased joystick actuation force. As an alternative to threshold circuit 30, the raw analog outputs from the graphic input device could be applied to the VCO(s) when the invention is in the type-a-matic repetitive operational mode as determined by delay 24, as described above.

In view of the foregoing, it is seen that the invention allows emulation of cursor control keys and the control of cursor movement in either of an analog and a digital mode with extreme ease of switching therebetween. Thus, particularly in compact designs, the invention provides a substitute for cursor keys and allows cursor keys to be omitted, saving cost and space on the device. Further, the invention provides enhancement of the digital cursor control mode by providing for speed control of cursor motion in a manner which is both intuitive and natural for the operator. Most importantly, however, the invention provides for convenient switching between cursor operational modes, providing enhanced convenience and speed of operation by a user, particularly for running applications capable of processing both text and graphics.

While the invention has been described in terms of a single preferred embodiment, those skilled in the art will recognize that the invention can be practiced with modification within the spirit and scope of the appended claims. For example, the principles of operation of the invention can readily be applied to the switching between several graphics input devices as well as modes of operation which may be available in regard to each such device. Toggling or switching between modes and/or input devices is not limited to two and any plurality of devices and operational modes can be sequenced or otherwise switched at will by a user. Implementation of the invention may be done within the keyboard structure or the graphic input device or respective drivers therefor. In any case, output to the system from any device operating in any mode is consistent with the signals which would otherwise be provided to the system and the invention may be retrofit to any data processing device using plural cursors and/or employed in the design of new equipment with attendant simplification and ease of use accruing therefrom.

Having thus described my invention, what we claim as new and desire to secure by Letters Patent is as follows:

1. A data processing system including means for producing a cursor image on a display, said data processing system including
    means for controlling an operational mode of controlling said cursor in response to manipulation of an isometric joystick, and
    means responsive to said means for controlling said operational mode of controlling said cursor for providing cursor motion to sequentially traverse screen locations in order of the screen locations as appearing on a display in response to each activation of said isometric joystick by an amount exceeding a threshold amount in a binary operational mode, said screen locations differing from a cursor motion increment in an analog operational mode.

2. A system as recited in claim 1, in said an analog mode said cursor is positioned at a resolution of one pixel.

3. A system as recited in claim 1, wherein said means for controlling an operational mode includes a means for switching between at least two circuits for processing signals from said isometric joystick device.

4. A system as recited in claim 3, wherein said means for switching includes a key of a keyboard.

5. A system as recited in claim 4, wherein said key of said keyboard controls toggling between said at least two circuits for processing signals from said isometric joystick.

6. A system as recited in claim 1, further including means for detecting a threshold level of actuation of said isometric joystick.

7. A system as recited in claim 6, further including
    delay means for delaying an output of said means for detecting a threshold level of actuation of said isometric joystick.

8. A system as recited in claim 7, further including
    means responsive to said delay means for causing repeated motion of said cursor on said display in response to continued actuation of said graphic input device for a period exceeding a time interval by which said delay means delays said output of said means for detecting a threshold level of actuation of said isometric joystick.

9. A system as recited in claim 7, further including
    a further delay circuit, and
    means for increasing a repetition rate of repeated cursor motion as duration of actuation of said isometric joystick increases.

10. A cursor controller for controlling two operational modes, said cursor controller including
    an isometric joystick,
    means for storing coordinates of a current cursor location,
    incremental means for incrementing or decrementing said coordinates in response to an actuation of said isometric joystick,
    binary operation means for increasing or decreasing said coordinates by an amount corresponding to sequential cell locations in order of the cell locations as appearing on a display in response to each actuation of said isometric joystick, wherein said binary operation means controls a first operational mode of said at least two operation modes,
    means for controlling said incremental and said binary means in a mutually exclusive manner.

11. A cursor controller as recited in claim 10, wherein said binary means includes
    threshold circuit means for detecting a threshold amount of actuation of said isometric joystick.

12. A cursor controller as recited in claim 10, wherein said binary means includes
    means for repeating said incrementing or decrementing of said coordinates in response to continued actuation of said isometric joystick.

13. A cursor controller as recited in claim 12, wherein said means for repeating includes a delay.

14. A cursor controller as recited in claim 10, wherein said binary means includes
    means for repeating said incrementing or decrementing of said coordinates in response to continued actuation of said isometric joystick, and means for varying a rate at which said incrementing or decrementing is repeated.

15. A cursor controller as recited in claim 14, wherein said means for repeating includes a delay.

16. A cursor controller as recited in claim 15, wherein said means for varying a rate includes a further delay.

17. A cursor controller as recited in claim 14, wherein said means for varying a rate includes a delay.

18. A cursor controller as recited in claim 10, wherein said means for controlling operation of said incremental means and said binary means in a mutually exclusive manner is responsive to a key of a keyboard.

19. A cursor controller as recited in claim 10, wherein one of said incremental means and said binary provides an output directly to a cursor key input to a processor.

20. A data processing system including means for producing a cursor image on a display, said data processing system including means for controlling said displayed cursor in response to manipulation of a graphic input device, said displayed cursor having at least two operational modes, said at least two operational modes including an analog mode and an object mode, and means responsive to said means for controlling said displayed cursor for providing cursor motion responsive to said graphic input device, in object mode said displayed cursor motion sequentially traversing object locations on said display in the order of the object locations as appearing on said display, said object locations differing from a cursor motion increment in an analog operational mode.

21. A system as recited in claim 20, wherein at least another of said at least two operational modes is an analog mode in which said cursor is positioned at a resolution of one pixel.

22. A system as recited in claim 20, wherein said means for controlling an operational mode includes a means for switching between at least two circuits for processing signals from said graphic input device.

23. A system as recited in claim 22, wherein said means for switching includes a key of a keyboard.

24. A system as recited in claim 20, further including means for detecting a threshold level of actuation of said graphic input device.

25. A system as recited in claim 24, further including delay means for delaying an output of said means for detecting a threshold level of actuation of said graphic input device.

26. A system as recited in claim 25, further including means responsive to said delay means for causing repeated motion of said cursor on said display in response to continued actuation of said graphic input device for a period exceeding a time interval by which said delay means delays said output of said means for detecting a threshold level of actuation of said graphic input device.

27. A system as recited in claim 25, further including a further delay circuit, and means for increasing a repetition rate of repeated cursor motion as duration of actuation of said graphic input device increases.

28. A system as recited in claim 23, wherein said key of said keyboard controls toggling between said at least two circuits for processing signals from said Graphic input device.

* * * * *